(12) United States Patent
Park (10) Patent No.: US 9,783,200 B2
(45) Date of Patent: Oct. 10, 2017

(54) APPARATUS AND METHOD FOR GUIDING DRIVER TO COASTING OF IN ECO-FRIENDLY VEHICLE

(71) Applicant: Hyundai Motor Company, Seoul (KR)

(72) Inventor: Joon Young Park, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/842,492

(22) Filed: Sep. 1, 2015

(65) Prior Publication Data

US 2016/0101780 A1  Apr. 14, 2016

(30) Foreign Application Priority Data

Oct. 13, 2014 (KR) .................... 10-2014-0137356

(51) Int. Cl.
| | | |
|---|---|---|
| B60W 30/18 | (2012.01) | |
| G01S 19/42 | (2010.01) | |
| B60W 50/00 | (2006.01) | |
| B60W 50/14 | (2012.01) | |

(52) U.S. Cl.
CPC .. B60W 30/18072 (2013.01); B60W 50/0097 (2013.01); B60W 50/14 (2013.01); *B60W 2050/146* (2013.01); *B60W 2520/10* (2013.01); *B60W 2550/142* (2013.01); *B60W 2550/143* (2013.01); *B60W 2550/402* (2013.01); *Y02T 10/84* (2013.01)

(58) Field of Classification Search
CPC ........... B60W 30/18072; B60W 50/14; B60W 2050/146; B60W 2250/143; B60W 2520/10; Y02T 10/84
See application file for complete search history.

(56) References Cited

U.S. PATENT DOCUMENTS

| | | | | |
|---|---|---|---|---|
| 2007/0005218 | A1* | 1/2007 | Ueyama ................ | B60W 30/16 701/96 |
| 2008/0167804 | A1* | 7/2008 | Geelen ................ | G01C 21/3655 701/408 |
| 2009/0128317 | A1* | 5/2009 | Hideshiro .............. | B60K 35/00 340/459 |
| 2011/0130930 | A1* | 6/2011 | Huang ................ | B60K 31/047 701/54 |
| 2012/0303203 | A1* | 11/2012 | Olsen ................... | G08G 1/0133 701/29.1 |

FOREIGN PATENT DOCUMENTS

| | | |
|---|---|---|
| JP | 2006-076415 A | 3/2006 |
| JP | 2010-149833 A | 7/2010 |
| JP | 2010-183687 A | 8/2010 |
| KR | 101428184 B1 | 8/2014 |

* cited by examiner

*Primary Examiner* — Redhwan K Mawari
*Assistant Examiner* — Rodney P King
(74) *Attorney, Agent, or Firm* — Mintz Levin Cohn Ferris Glovsky and Popeo, P.C.; Peter F. Corless (57) ABSTRACT

The present disclosure provides an apparatus and method for guiding a driver in coasting of an eco-friendly vehicle at an appropriate timing in a situation where deceleration is needed, which can enable economic driving through energy savings and improve the mileage and fuel efficiency of the vehicle.

20 Claims, 5 Drawing Sheets

APPARATUS AND METHOD FOR GUIDING DRIVER TO COASTING OF IN ECO-FRIENDLY VEHICLE

CROSS-REFERENCE TO RELATED APPLICATION

This application claims under 35 U.S.C. §119(a) the benefit of Korean Patent Application No. 10-2014-0137356 filed on Oct. 13, 2014, the entire contents of which are incorporated herein by reference.

BACKGROUND (a) Technical Field

The present disclosure relates generally to an apparatus and method for guiding a driver in coasting of a vehicle. More particularly, the present disclosure relates to an apparatus and method for guiding a driver to coasting in eco-friendly vehicles such as electric vehicles (EVs), hybrid electric vehicles (HEVs), and fuel cell electric vehicles (FCEVs).

(b) Background Art

Internal combustion engine vehicles using fossil fuels, such as gasoline and diesel, have a variety of limitations such as environmental contamination caused by the engine exhaust, global warming caused by carbon dioxide emissions, and respiratory illnesses caused by creation of the ozone. Accordingly, newer vehicles have been developed, including vehicles driven by electric power i.e., eco-friendly vehicles such as electric vehicles (EVs) driven by a motor, hybrid electric vehicles (HEVs) driven by an engine and a motor, and fuel cell electric vehicles (FCEVs) driven by a motor powered by electricity generated from fuel cells.

In such eco-friendly vehicles, during the braking or coasting by inertia, regenerative braking (RB) is performed in which the vehicle's inertial energy is recovered through a motor's electricity generation operation to charge batteries (i.e., motor charging). Particularly, when a driver recognizes the need to slow down due to events such as an crossroad, traffic lights, a curved road, nearby vehicles, or other obstacles appearing ahead of the vehicle (i.e., a deceleration event), and takes his/her foot off the accelerator pedal, it is possible to recover energy through the vehicle's coasting control, i.e., the motor torque control, that performs electric generation.

As is well-known in the art, when a driver of an eco-friendly vehicle removes his/her foot from the brake pedal and the accelerator pedal during deceleration of the vehicle, coasting is performed. In this case, the vehicle is decelerated through coasting torque (i.e., negative torque) control on the motor, and energy simultaneously recovered by the motor is stored in batteries.

Here, "Pedal off" means a state in which a driver does not apply or releases the relevant pedal, while "Pedal on", on the other hand, means a state in which the driver applies the relevant pedal. Thus, in an eco-friendly vehicle, vehicle energy is recovered and converted to electric energy using a motor during the braking or coasting, and the recovered electric energy is stored in batteries so as to be reused for driving the motor, thereby enabling increase of mileage (i.e., driving distance), improvement of the fuel efficiency, and efficient use of energy.

Figure 1:
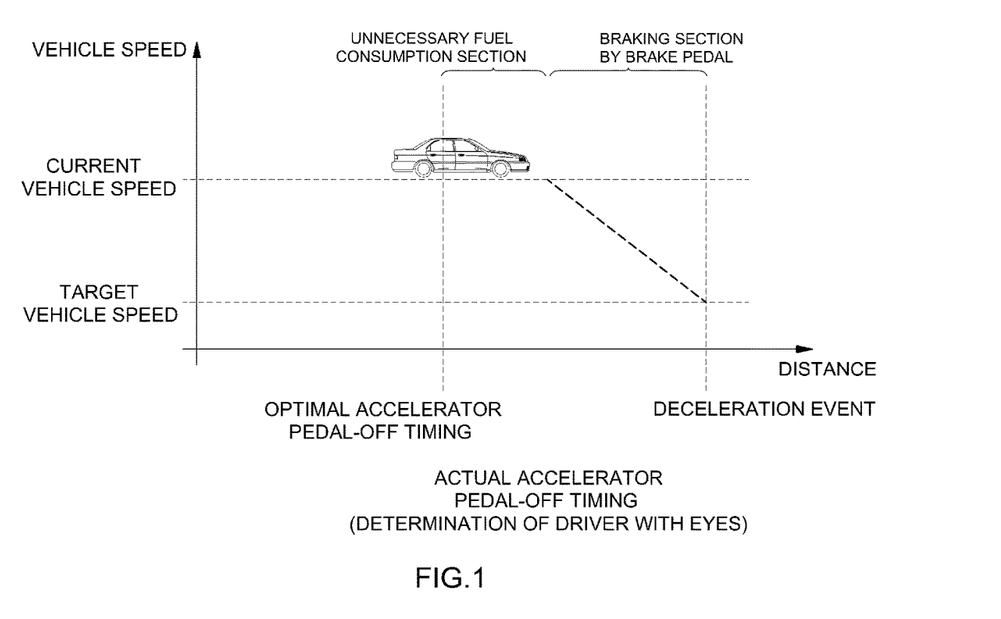
FIG. 1 is a graph illustrating a typical deceleration pattern of a driver.

FIG. 1 is a graph illustrating a typical deceleration pattern of a driver. Most drivers take their foot off the accelerator pedal and then step on the brake pedal to decelerate a vehicle from the current speed to the target speed via the brake (i.e., frictional braking unit) when a deceleration event exists at the front side of a vehicle. In this case, drivers determine the timing to take his/her foot off the accelerator pedal and the timing to step on the brake pedal using their eyes. In reality, most drivers take their foot off the accelerator pedal later than appropriate timing for pedal-off and rush to step on the brake pedal for deceleration of the vehicle. Such deceleration suffers disadvantages in terms of mileage and fuel efficiency, as compared to deceleration only by coasting.

On the other hand, in cases of eco-friendly vehicles such as electric, hybrid and fuel cell vehicles, since it is possible to control torque over the drive motors, i.e., a motor for driving the vehicles, the vehicles are able to realize deceleration through torque control (i.e., coasting torque control) on the drive motor while coasting, which is similar to the deceleration of an internal combustion engine vehicle equipped with an automatic transmission. When a driver takes his/her foot off the accelerator pedal at an appropriate time after the driver recognizes a deceleration event in advance, without working on a brake pedal, the driver can reduce the speed of the vehicle smoothly down to a target speed through motor torque control. When a vehicle is decelerated by operating on the brake pedal, not only by coasting, since the total braking force is secured by distribution between frictional braking from the brake and regenerative braking from the motor, energy recovery is performed while being limited only to distributed regenerative braking, causing a disadvantage in increasing mileage and improving fuel efficiency.

Accordingly, it is advantageous to decelerate a vehicle from a current speed down to a target speed only through coasting without the operation of a brake, if possible. Furthermore, in case of eco-friendly vehicles, the deceleration force of a vehicle can be controlled by varying the torque of a drive motor during the coasting.

When drivers take advantage of such deceleration force adjustment by use of the drive motor while coasting a vehicle with accelerator and brake pedal off, i.e., without use of a brake operation and using only the vehicle's natural friction, drivers can reduce the speed down to a target speed at a desired location. Accordingly, the mileage and the fuel efficiency are improved moreso when a driver takes the foot off the accelerator pedal at an appropriate timing and then puts on the brake versus taking off the foot later. There is also an advantage in that replacement of consumable parts in the brake system may be extended.

Therefore, it is advantageous for mileage increase and fuel efficiency improvement in eco-friendly vehicles to be able to make the most of deceleration through coasting without brake operation while reducing the speed from a current speed to a target speed. For this, appropriate coasting torque control over a drive motor is required. A function for guiding and inducing a driver into coasting by taking his/her foot off the accelerator pedal at an appropriate timing is also needed.

Figure 2:
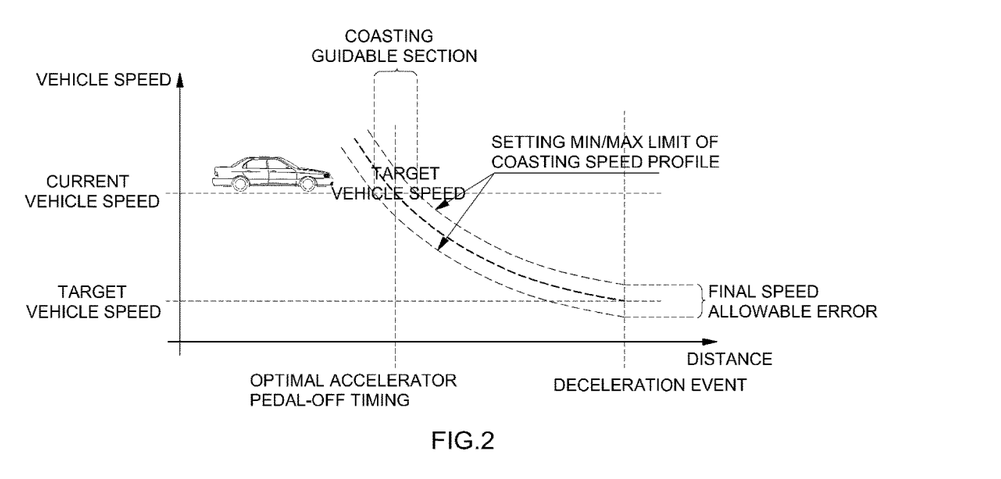
FIG. 2 is a graph illustrating a typical coasting inducible and guidable section.

In this regard, FIG. 2 is a graph illustrating a typical coasting inducible and guidable section. When a driver intends to reduce the current vehicle speed to the target speed, there is a speed difference at a location of a deceleration event where deceleration of a vehicle needs to be completed when a driver differentiates the accelerator pedal-off timing based on an optimal pedal-off timing. Particularly, since adjustment of the engine drag is impossible, it is difficult for an internal combustion engine vehicle to set and control deceleration of the vehicle in a desired speed profile.

Accordingly, since the internal combustion engine vehicle can only reduce the speed in a uniform speed profile form, as shown in FIG. 2, it is difficult for the vehicle to guide (at the accelerator pedal-off point) and induce a driver into coasting such that the speed of the vehicle at the location of a deceleration event falls within the final speed allowable error. That is, it is difficult to induce the driver into coasting such that the vehicle can be decelerated according to a speed profile between the maximum and minimum limits by setting the maximum and minimum limits of the coasting speed profile based on the final speed allowable error.

Notably, time (i.e., coasting guide section in FIG. 2) for guiding a driver to the timing for coasting (i.e., accelerator pedal-off timing) is relatively short (see time interval for guiding coasting as shown in FIG. 2). When a driver cannot recognize an appropriate accelerator pedal-off point during the short time period within the final speed allowable error, coasting becomes impossible. Even when a guide function is provided, the function does not operate if the appropriate timing is missed.

On the other hand, in an eco-friendly vehicle, the speed profile for deceleration of a vehicle can be controlled within the final speed allowable error through a coasting torque control on the drive motor. Thus, even with the final speed allowable error of the final speed set constant, it is possible to extend the time period for guiding a driver to coasting. However, there is little research so far on the technology that allows a driver of an eco-friendly vehicle to be guided and induced into coasting at an appropriate timing in accordance with driving situations such that eco-driving can be realized through energy recovery. Consequently, drivers do not recognize the timing for coasting, and coasting is thus not performed at an appropriate timing in spite of a situation where coasting may be possible. This makes it difficult to recover energy, increase the mileage, and improve the fuel efficiency through coasting.

The above information disclosed in this Background section is only for enhancement of understanding of the background of the disclosure, and therefore, it may contain information that does not form the related art that is already known to a person of ordinary skill in the art.

SUMMARY OF THE DISCLOSURE

The present disclosure provides an apparatus and method for guiding a driver to coasting of an eco-friendly vehicle, which can enable economic driving through energy saving by guiding and inducing a driver into coasting at an appropriate timing in a situation where deceleration is needed, and can improve the mileage and the fuel efficiency.

According to embodiments of the present disclosure, an apparatus for guiding a driver in coasting of an eco-friendly vehicle includes: a vehicle speed detector detecting a current vehicle speed of the vehicle; a data storage unit storing map data including information about locations of deceleration events at which the vehicle needs to be decelerated and information about target vehicle speeds at each deceleration event; a Global Positioning System (GPS) receiver receiving GPS information; an information providing unit providing information to the driver; and a controller acquiring i) the current vehicle speed from the vehicle speed detector, ii) the information about locations of the deceleration events and the information about the target vehicle speeds in the map data from the data storage unit, and iii) the GPS information from the GPS receiver, determining whether the vehicle enters a coasting guide section based on the current vehicle speed and a target vehicle speed at a deceleration event in front of the vehicle, and controlling the information providing unit so as to output information for guiding the driver in coasting of the vehicle when determining that the vehicle enters the coasting guide section.

Furthermore, according to embodiments of the present disclosure, a method for guiding a driver in coasting of an eco-friendly vehicle includes: acquiring, by a controller, i) a current speed of the vehicle detected through a vehicle speed detector, ii) a location of a deceleration event in front of the vehicle at which the vehicle needs to be decelerated, iii) a target vehicle speed at the deceleration event from map data stored in a data storage unit, and iv) Global Positioning System (GPS) information received from a GPS receiver; determining, by the controller, whether the vehicle enters a coasting guide section based on the current speed of the vehicle and the target vehicle speed at the deceleration event; and controlling, by the controller, an information providing unit such that the information providing unit outputs information for guiding the driver in coasting of the vehicle when the controller determines that the vehicle enters the coasting guide section.

Other aspects and embodiments of the disclosure are discussed infra.

BRIEF DESCRIPTION OF THE DRAWINGS

The above and other features of the present disclosure will now be described in detail with reference to certain embodiments thereof illustrated the accompanying drawings which are given hereinbelow by way of illustration only, and thus are not imitative of the present disclosure, and wherein.

It should be understood that the accompanying drawings are not necessarily to scale, presenting a somewhat simplified representation of various exemplary features illustrative of the basic principles of the disclosure. The specific design features of the present disclosure as disclosed herein, including, for example, specific dimensions, orientations, locations, and shapes will be determined in part by the particular intended application and use environment. The reference numbers refer to the same or equivalent parts of the present disclosure throughout the several figures of the drawing.

DETAILED DESCRIPTION OF THE EMBODIMENTS

Hereinafter reference will now be made in detail to various embodiments of the present disclosure, examples of which are illustrated in the accompanying drawings and described below. While the disclosure will be described in conjunction with embodiments, it will be understood that present description is not intended to limit the disclosure to those embodiments. On the contrary, the disclosure is intended to cover not only the embodiments, but also various alternatives, modifications, equivalents and other embodiments, which may be included within the spirit and scope of the disclosure as defined by the appended claims.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

Hereinafter, embodiments of the present disclosure will be described in detail with reference to the accompanying drawings so that those skilled in the art can readily carry out the present disclosure.

The present disclosure provides an apparatus and method for guiding a driver to coasting of an eco-friendly vehicle, which can enable economic driving through energy saving by guiding and inducing a driver into coasting at an appropriate timing in a situation where deceleration is needed, and can improve the mileage and the fuel efficiency. The apparatus and method for guiding a driver to coasting of a vehicle can be usefully applied to eco-friendly vehicles such as electric vehicles (EVs), hybrid electric vehicles (HEVs), and fuel cell electric vehicles (FCEVs), which use a motor a driving source for running of a vehicle and enable energy recovery through the motor upon coasting.

Figure 3:
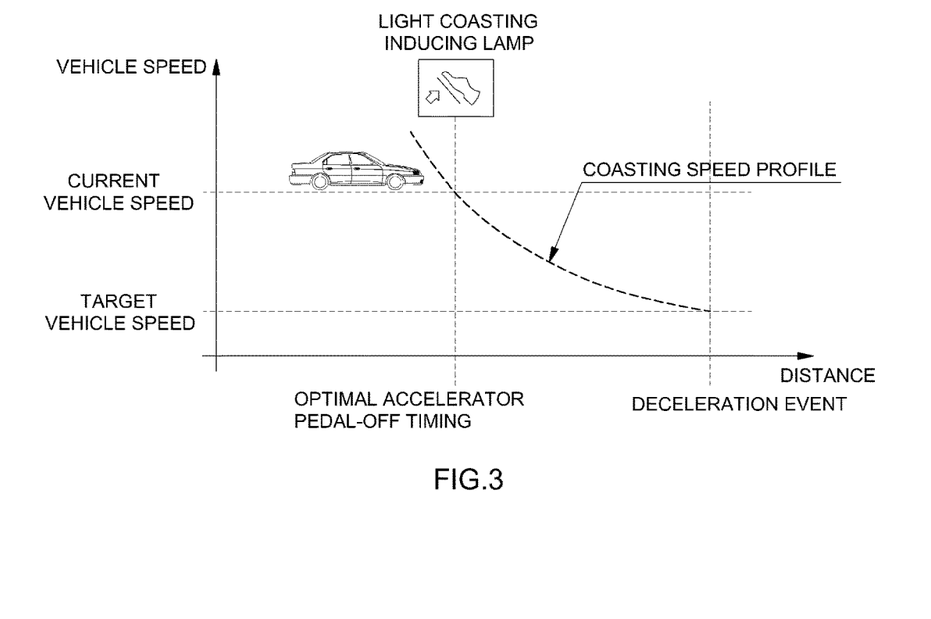
FIG. 3 is a graph illustrating the concept of a coasting guide method according to embodiments of the present disclosure.

FIG. 3 is a graph illustrating the concept of a coasting guide method according to embodiments of the present disclosure. A deceleration event indicated in the drawing may be located at the front side of a vehicle on a road on which a vehicle runs, and may mean a place where the deceleration of a vehicle is need up to a target vehicle speed. For example, the deceleration event may include a speed limit road, a crossroad, a curved road, and the like.

The target vehicle speed at the deceleration event may be a regulation speed of a road requiring the speed limit, a regulation speed at a crossroad, or a regulation speed that is set according to the road curvature of a curved road. Also, the current location of a vehicle and information about the deceleration event that is location information of the deceleration event and target vehicle speed information in the deceleration event may be acquired, by a controller, using a highly-detailed map stored in a data storage unit and Global Positioning System (GPS) information (e.g., GPS signals) received through a GPS receiver.

The highly-detailed map may provide three-dimensional (3D) road information including altitude information on a two-dimensional plane. The highly-detailed map may be three-map data that provide information of the location and target vehicle speed at the deceleration event, and information about the road slope (i.e., inclination) from the current location of a vehicle to the location of the deceleration event.

The three-dimensional map data may be a map database of an Advanced Driver Assistance System (ADAS) mounted onto a vehicle. The location information of the deceleration event in which deceleration is need, and the target vehicle speed information at the deceleration event, and the information about the road slope may be stored in the three-dimensional map database of the ADAS so as to be used.

As shown in FIG. 3, the controller may recognize the current location of a vehicle and the deceleration event at the front side of a vehicle using the 3D map data stored in the data storage unit and the GPS information received through the GPS receiver during the running, and guiding a driver through a information providing unit about an optimal timing when a driver needs to release an accelerator pedal. In other words, the controller may recognize a situation where deceleration is needed at places such as speed limit roads, crossroads, and curved roads, and then may guide a driver through an appropriate time to take his/her foot off the accelerator pedal and thus induce a driver to coast driving.

In this case, the controller may acquire the current vehicle speed detected by a vehicle speed detector, the current location of a vehicle, the location of the deceleration event and the target vehicle speed obtained from the GPS information, the distance (hereinafter, referred to as "residual distance") from the current location of a vehicle and the location of the deceleration event, and the road slope (the average slope of a road, for example) information, and may guide a driver through the information providing unit about the accelerator pedal off timing based on the acquired information. The information providing unit may be a component that allows a driver to take his/her foot off the accelerator pedal (i.e., release the accelerator) and thus guides a driver to coast driving. The information providing unit may be an apparatus that induces a driver to coast driving through a visual method or auditory method. In case of visual method, the information providing unit may include a display device or a guide lamp which is provided in a cluster as shown in FIG. 3.

Figure 4:
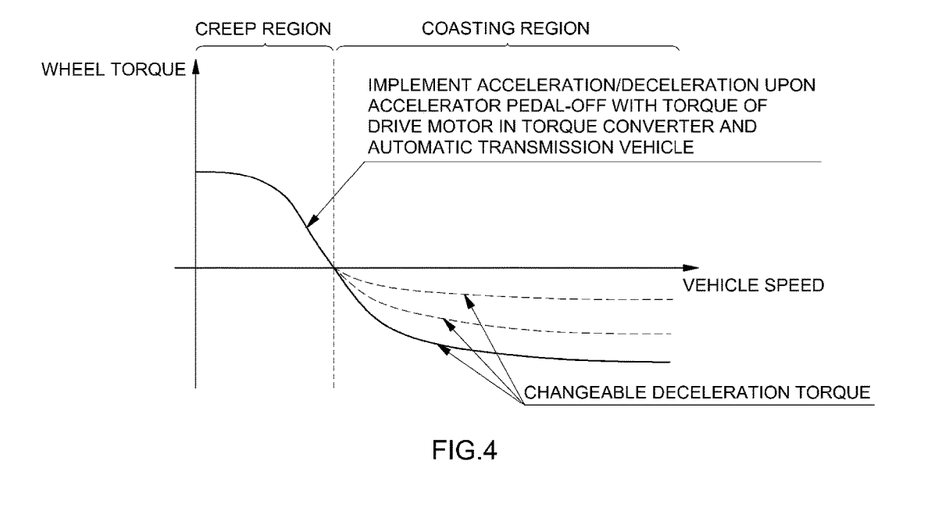
FIG. 4 is a graph illustrating a creep torque and a coasting torque in an eco-friendly vehicle.

FIG. 4 is a reference drawing for describing the present disclosure, and shows the characteristics of a creep torque and a coasting torque in an eco-friendly vehicle and shows the state of a wheel torque according to the vehicle speed is shown.

As is well-known in the art, in an eco-friendly vehicle, "creep driving" or coasting may be performed in an off-state of a brake pedal and an accelerator pedal. A creep region in which the creep driving is performed and a coasting region in which coasting is performed may be differentiated according to the vehicle speed. Also, the creep torque is a positive torque, and the torque (i.e., coasting torque) of a drive motor during coasting is a negative torque. Acceleration/deceleration sense in the accelerator pedal off state in an automatic transmission vehicle may be implemented with the torque of the drive motor.

During coasting of an eco-friendly vehicle, energy may be recovered by the electricity generation of the drive motor. During the coasting, the torque of the drive motor may be a charging torque (e.g., electricity generation torque or regenerative braking torque) which recharges a battery while generating a braking force. Unlike internal combustion engine vehicles in which the torque is determined by the engine drag during the coasting, in eco-friendly vehicles, the deceleration and vehicle deceleration degree may be changed through motor torque control (i.e., coasting torque control) when necessary.

In FIG. 3, a coasting speed profile shows a vehicle speed variation diagram in which the vehicle deceleration is performed by the coasting torque controlled for the drive motor. Also, this is a speed diagram which enables final deceleration of the target vehicle speed by the coasting torque control for the drive motor until a vehicle reaches the deceleration event from a current location thereof.

Figure 5:
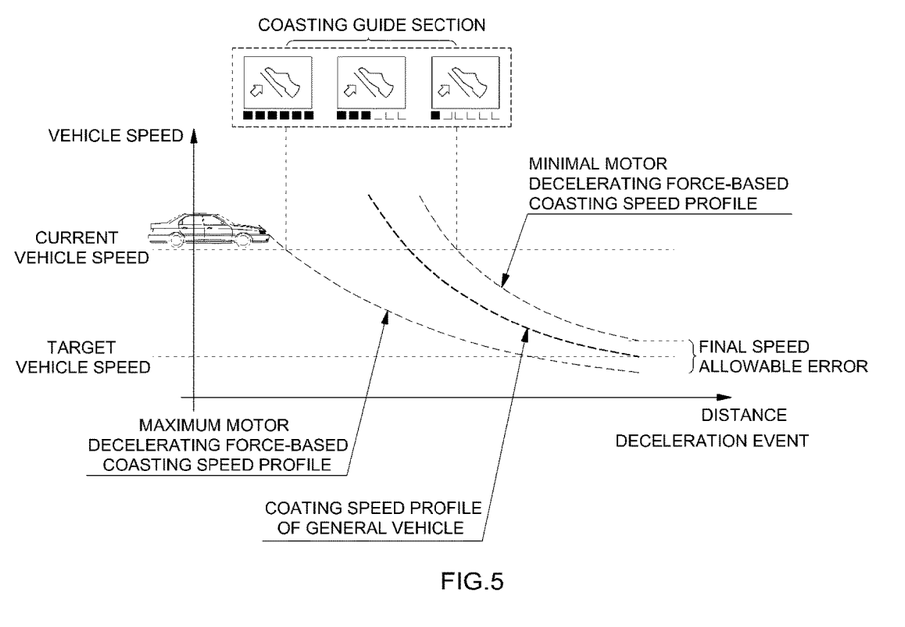
FIG. 5 is a graph illustrating a coasting guide section according to embodiments of the present disclosure.

FIG. 5 is a graph illustrating a coasting guide section according to embodiments of the present disclosure. The range limit of the decelerating force which indicates a final speed allowable error set based on the target vehicle speed of the deceleration event located at the front side may be set as a guide section, and a driver may be guided to coasting within the guide section.

Particularly, a driver may be guided in coasting the vehicle within the range limit of the decelerating force which is determined through the motor torque variation in regard to the upper limit speed and the lower limit speed of the final speed allowable error based on the target vehicle speed. Thus, the range of the coasting guide section may be expanded, and simultaneously, the opportunity of the fuel efficiency improvement may increase.

The coasting guide section described herein may be obtained as a section where a driver needs to take his/her foot off the accelerator pedal in order to decelerate a vehicle to a speed within the final speed allowable error set based on the target vehicle speed when a vehicle reaches the location of the deceleration event by running under the current vehicle speed and road slope (e.g., average slope) conditions and thereafter decelerating through coasting on a road to the deceleration event at the front side of a vehicle.

Referring to FIG. 5, the upper limit speed and the lower limit speed which regulate the upper limit speed allowable error range at the corresponding deceleration event based on the target vehicle speed of the location of the deceleration event, and the final speed allowable error corresponding to a difference between the upper limit speed and the lower limit speed may be preset. A minimal motor decelerating force-based coasting speed profile which can decelerate a vehicle from a current vehicle speed to an upper limit speed within the final speed allowable error may be set, and a maximum motor decelerating force-based coasting speed profile which can decelerate a vehicle from a current vehicle speed to a lower limit speed within the final speed allowable error may be set.

The minimal motor decelerating force-based coasting speed profile may be defined as a vehicle speed variation profile in which a driver slowly reduces the vehicle speed with the minimal motor deceleration torque through the torque control of the drive motor when taking his/her off the accelerator pedal, allowing the vehicle speed to be reduced to the lower limit speed at the location of the deceleration event.

According to the minimal motor decelerating force-based coasting speed profile, since the vehicle speed is relatively slowly reduced from the accelerator pedal off timing with the minimal motor deceleration torque through the coasting torque control of the drive motor, the vehicle deceleration and vehicle deceleration rate is relatively low, and a vehicle earlier enters the coasting state. Accordingly, the effect of fuel efficiency improvement may be greatest, but since the speed reduction rate is low, the traffic flow may be blocked.

On the other hand, the maximum motor decelerating force-based coasting speed profile may be defined as a vehicle speed variation profile in which a driver rapidly reduces the vehicle speed with the maximum motor deceleration torque through the torque control of the drive motor when taking his/her off the accelerator pedal, allowing the vehicle speed to be reduced to the upper limit speed at the location of the deceleration event.

According to the maximum motor decelerating force-based coasting speed profile, since the vehicle speed is relatively rapidly reduced from the accelerator pedal off timing with the maximum motor deceleration torque through the coasting torque control of the drive motor, the vehicle deceleration and vehicle deceleration rate is relatively high, and a vehicle relatively later enters the coasting state. Accordingly, energy may be partially recovered due to the motor charging, but the effect of the fuel efficiency improvement may be relative low due to a path loss.

Also, when a driver takes his/her foot off the accelerator pedal, the vehicle speed may be reduced along the minimal motor decelerating force-based coasting speed profile from an accelerator pedal off location. Thereafter, when the vehicle speed reaches the lower limit speed at the deceleration event, the accelerator pedal off location may become a start location of the coasting guide section.

In addition, when a driver takes his/her foot off the accelerator pedal, the vehicle speed may be reduced along the maximum motor decelerating force-based coasting speed profile from an accelerator pedal off location. Thereafter, when the vehicle speed reaches the upper limit speed at the deceleration event, the accelerator pedal off location may become an end location of the coasting guide section.

Figure 7:
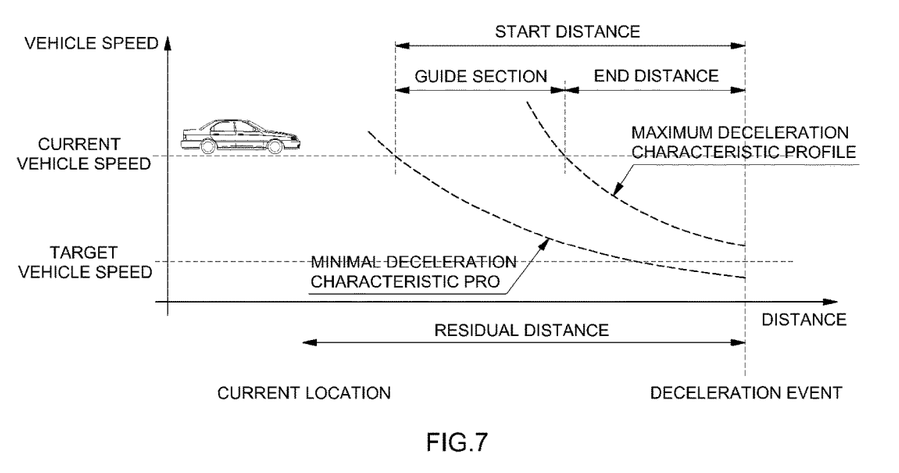
FIG. 7 is a graph illustrating a coasting guide method according to embodiments of the present disclosure.

Herein, a section between the start location and the end location may be defined as a guide section in which a drive can be guided to coasting (e.g., see FIG. 7). Also, a distance from the start location of the guide section to the deceleration event may be defined as a start distance, and a distance from the end location of the guide section to the deceleration event may be defined as an end distance (e.g., see FIG. 7).

In FIG. 5, the coasting speed profile of a general vehicle may be a speed profile in which a vehicle accurately reaches the target vehicle speed at the location of the deceleration event, and the accelerator pedal off timing thereof may become an optimal accelerator pedal off timing which can allow the vehicle speed to accurately reach the target vehicle speed at the deceleration event. The controller may use the coasting guide section at the average road slope and the current vehicle speed obtained according to the minimal motor decelerating force-based coasting speed profile and the maximum motor decelerating force-based coasting speed profile set based on the target vehicle speed and the final speed allowable error, and may guide a driver to coasting by allowing a driver to take his/her foot off the accelerator pedal within the coasting guide section by a visual or auditory method through the information providing unit. Particularly, since a driver can recognize the vehicle progress degree in the coasting guide section when guided to coasting, a driver may select a deceleration timing (i.e., accelerator pedal-off timing) within the coasting guide section in consideration of the rear traffic state.

At the initial stage of the coasting guide section, when a driver takes his/her foot off the accelerator pedal, the fuel efficiency may increase, but the traffic flow may be blocked. For this reason, a driver may be allowed to select the deceleration timing when a vehicle is in entrance state to the coasting guide section. For this, the controller may control the operation of the information providing unit so as to inform a driver of the vehicle progress degree, i.e., the relative location information of a vehicle within the coasting guide section in accordance with a predetermined guide method. Thus, a driver may be induced to take his/her foot off the accelerator pedal at an optimal location at which the traffic flow is not blocked, by informing that a vehicle enters the coasting guide section that is a coasting enterable range through the information providing unit, and simultaneously, informing of the vehicle progress degree in the guide section such that a driver can select the coasting entrance timing.

Referring to FIGS. 3 and 5, a guide lamp is shown as the information providing unit for inducing coasting. The guide lamp may be lighted at a time when a vehicle enters the coasting guide section, guiding a driver to coasting by allowing a driver to take his/her foot off the accelerator pedal. In this case, a method for displaying the relative location of a vehicle in the vehicle progress degree, i.e., the relative location of a vehicle, within the guide section through a progress bar may be applied. In other words, at a timing when a vehicle enters the guide section, the guide lamp may be lighted, and the location of a vehicle may be displayed with the lighting degree of the progress bar (e.g., bar graph) under the guide lamp. For example, the progress bar may be all lighted at the start point of entrance, and then the progress bar may be turned off one by one according to the vehicle progress degree within the guide section as a vehicle travels forward, gradually reducing the lighting display of the progress bar.

In addition, the vehicle progress degree within the guide section may be indicated with number, or the color or brightness of the guide lamp may be changed in accordance with the vehicle progress degree. Also, the flickering cycle of the guide lamp may be changed to differentiate the vehicle progress degree (e.g., see FIG. 6). Consequently, a driver can take his/her foot off the accelerator pedal at a certain location of the guide section where the traffic flow is not blocked, by checking the vehicle progress degree in the guide section and simultaneously checking the surrounding vehicles. Thus, coasting of a vehicle, which enables energy recovery, can start while a driver takes his/her foot off the accelerator pedal.

Figure 6:
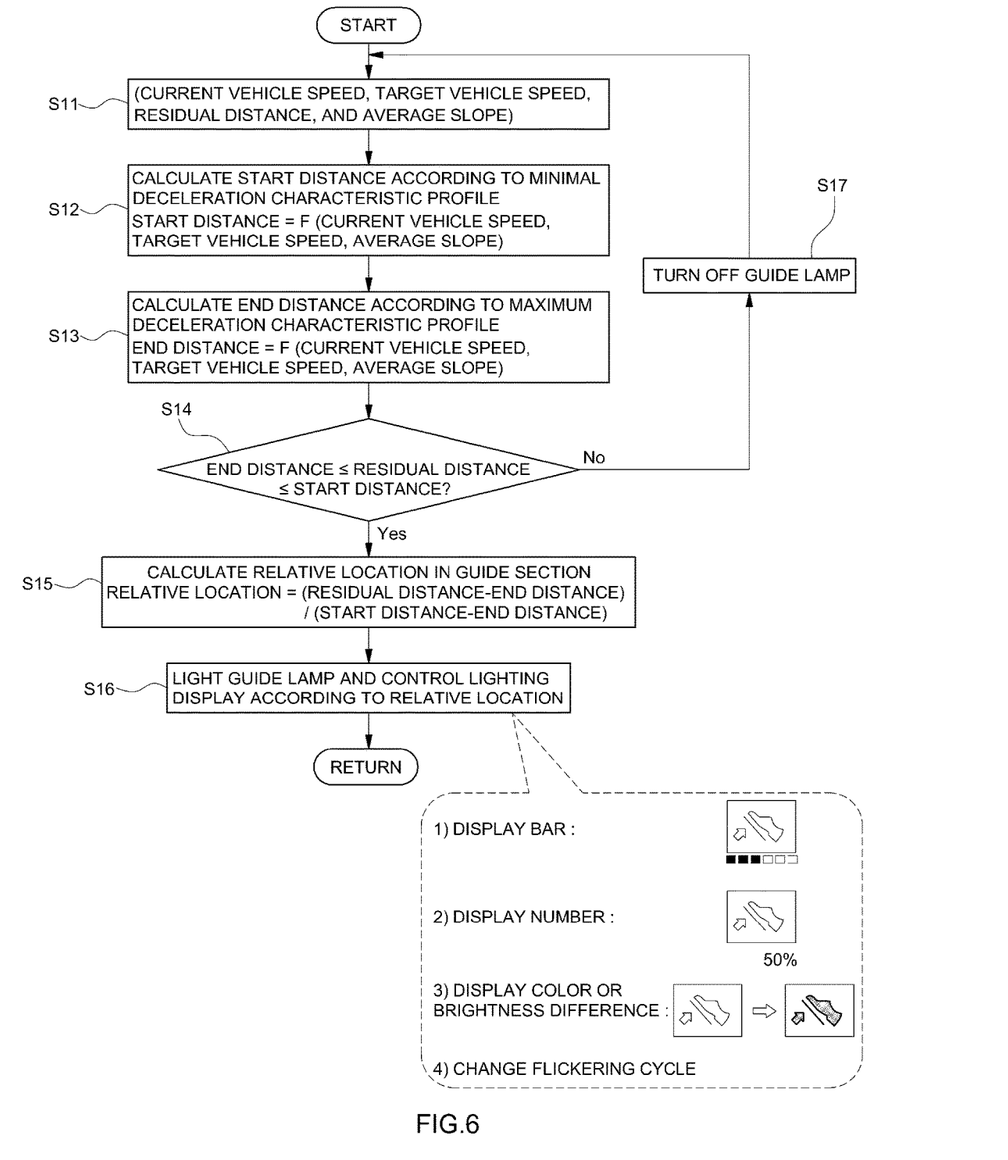
FIG. 6 is a graph illustrating a coasting guide method according to embodiments of the present disclosure.

Hereinafter, a process of inducing a vehicle to coast according to embodiments of the present disclosure will be described in more detail with reference to FIGS. 6 and 7.

First, the controller may receive the current speed of a vehicle from the vehicle speed detector, and may acquire 3D map data stored in the data storage unit and the current location information of a vehicle based on the GPS information (i.e., vehicle location information) received from the GPS receiver, the location information of the deceleration event at the front side of a vehicle and the target vehicle speed thereof, and the average slope of a road from the current location to the deceleration event (S11). The residual distance defined as a distance from the current location of a vehicle to the location of the deceleration event may be acquired in real-time (e.g., see FIG. 7).

Next, the controller may calculate the start distance and the end distance which are determined in accordance with the current vehicle speed, the target vehicle speed, and the average slope of a road (S12 and S13). In this case, the start distance and the end distance may be calculated from foregoing input parameters (i.e., current vehicle speed, target vehicle speed, and road slope) through a certain functional formula or map data. Also, the start distance may be a distance from the start location of the coasting guide section to the deceleration event, and the end distance may be a distance from the end location of the guide section to the deceleration event.

Here, the end distance and the start distance together with the residual distance may be used to determine whether a vehicle enters the coasting guide section. The start location and the end location of the coasting guide section, and the start distance and the end distance may be values related to the current vehicle speed and the target vehicle speed, the average slope of a vehicle, and the final speed allowable error (i.e., upper limit speed and lower limit speed) at the predetermined deceleration event.

The start location and the start distance may relate to a minimal deceleration characteristic profile (indicated as "minimal motor decelerating force-based coasting speed profile" in FIG. 5) and the entrance location and distance thereof to coasting (i.e., distance between the entrance location and the deceleration event), which enable the vehicle speed to reach the lower limit speed of the final speed allowable error at the deceleration event when the vehicle speed is thereafter controlled to be reduced with the minimal deceleration torque through the coasting torque control under the current vehicle speed and the average slope of a road. Particularly, when a vehicle runs under the conditions of the current vehicle speed and the average slope of a road, the accelerator pedal off location at which the vehicle speed is reduced with the minimal deceleration torque of the drive motor during the coasting and then reaches the lower limit speed of the final speed allowable error may become the start location.

Also, the end location and the end distance may relate to a maximum deceleration characteristic profile (i.e., maximum motor decelerating force-based coasting speed profile) and the entrance location and distance thereof to coasting (i.e., distance between the entrance location and the deceleration event), which enable the vehicle speed to reach the upper limit speed of the final speed allowable error at the deceleration event when the vehicle speed is thereafter controlled to be reduced with the maximum deceleration torque through the coasting torque control under the current vehicle speed and the average slope of a road. Particularly, when a vehicle runs under the conditions of the current vehicle speed and the average slope of a road, the accelerator pedal off location at which the vehicle speed is reduced with the maximum deceleration torque of the drive motor during the coasting and then reaches the upper limit speed of the final speed allowable error may become the end location.

Next, the controller may check from information about the end distance, the start distance and the residual distance whether a vehicle enters the coasting guide section (S14). When the residual distance is greater than or equal to the end distance and is less than or equal to the start distance, it may be determined that a vehicle has entered the guide section.

Next, the control may inform a driver through the information providing unit that a vehicle has entered the coasting guide section. For example, the guide lamp may be lighted to display the entrance of a vehicle to the guide section (S16).

Also, from the timing at which a vehicle enters the coasting guide section, a driver may be informed through the information providing unit of the relative location of a vehicle (hereinafter, referred to as 'relative location') in the guide section (S15 and S16). Here, the relative location may be calculated from Equation (1) below.

Relative Location=(Residual Distance−End Distance)/(Start distance−End distance)  (1)

When the relative location is calculated as above, the guide lamp may be lighted and simultaneously the relative location may be displayed in order to inform a driver of the relative location. In this case, as described above, a method of displaying the relative location by changing the progress bar, number, color or brightness, and flickering cycle according to the relative location may be applied.

Finally, a driver may perform coasting of a vehicle without interrupting the traffic flow by taking his/her foot off the accelerator pedal while checking the guide lamp lighting and the relative location information and simultaneously checking the surrounding traffic situation with eyes. Also, after the entrance of a vehicle to coasting, a battery may be recharged by a motor simultaneously with the deceleration of a vehicle.

Accordingly, an apparatus and method for guiding a driver to coasting of an eco-friendly vehicle can enable energy recovery and economic driving through coasting by guiding and inducing a driver into coasting at an appropriate timing in a situation where deceleration of a vehicle is needed, and can improve the mileage and the fuel efficiency.

The disclosure has been described in detail with reference to embodiments thereof. However, it will be appreciated by those skilled in the art that changes may be made in these embodiments without departing from the principles and spirit of the disclosure, the scope of which is defined in the appended claims and their equivalents.

What is claimed is:

1. An apparatus for guiding a driver in coasting of an eco-friendly vehicle, the apparatus comprising:
   a vehicle speed detector detecting a current vehicle speed of the vehicle;
   a data storage unit storing map data including information about locations of deceleration events at which the vehicle needs to be decelerated and information about target vehicle speeds at each deceleration event;
   a Global Positioning System (GPS) receiver receiving GPS information;
   an information providing unit providing information to the driver; and
   a controller:
      acquiring i) the current vehicle speed from the vehicle speed detector, ii) the information about locations of the deceleration events and the information about the target vehicle speeds in the map data from the data storage unit, iii) the GPS information from the GPS receiver, iv) a current decelerating force of the vehicle, and v) a range of the decelerating force based on motor torque of the vehicle,
      determining whether the vehicle enters a coasting guide section, which is a section of a road on which the deceleration event is located, based on the current vehicle speed, a target vehicle speed at a deceleration event in front of the vehicle, the current decelerating force of the vehicle, and the range of the decelerating force, and
      controlling the information providing unit so as to output information for guiding the driver in coasting of the vehicle when determining that the vehicle enters the coasting guide section.

2. The apparatus of claim 1, wherein the map data is three-dimensional (3D) map data including road slope information indicating a road slope, and
   the controller acquires road slope information associated with the deceleration event from the 3D map data and determines whether the vehicle enters the coasting guide section based on the current vehicle speed, the target vehicle speed, and the road slope.

3. The apparatus of claim 2, wherein the coasting guide section is a section of a road on which the deceleration event is located where the driver needs to take his/her foot off an accelerator pedal in order to decelerate the vehicle to a speed within a final speed allowable error, which is set based on the target vehicle speed when the vehicle reaches the location of the deceleration event by driving according to the current vehicle speed and the road slope and thereafter decelerating by coasting.

4. The apparatus of claim 3, wherein the controller:
   acquires in real-time a residual distance between the deceleration event and a current location of the vehicle based on the 3D map data and the GPS information;
   calculates a start distance between a start location of the coasting guide section and the deceleration event and an end distance between an end location of the coasting guide section and the deceleration event based on the current vehicle speed, the target speed, and the road slope; and
   determines whether the vehicle enters the coasting guide section according to the calculated start distance, the calculated end distance, and the acquired residual distance.

5. The apparatus of claim 4, wherein the start location is calculated based on an accelerator pedal-off location at which a speed of the vehicle is reduced with a minimal deceleration torque of a drive motor during the coasting according to the current vehicle speed and the road slope and then reaches a lower limit speed of the final speed allowable error, and
   the end location is calculated based on an accelerator pedal-off location at which the speed of the vehicle is reduced with a maximum deceleration torque of the drive motor during the coasting according to the current vehicle speed and the road slope and then reaches an upper limit speed of the final speed allowable error.

6. The apparatus of claim 4, wherein the controller determines that the vehicle enters the coasting guide section when the residual distance is greater than or equal to the end distance and is less than or equal to the start distance.

7. The apparatus of claim 4, wherein the controller obtains a relative vehicle location indicating a vehicle progress degree within the coasting guide section based on the start distance, the end distance, and the residual distance, and
   the information providing unit informs the driver of the relative vehicle location.

8. The apparatus of claim 7, wherein the information providing unit indicates the vehicle progress degree within the coasting guide section by displaying a progress bar or numbers, by changing a color or brightness of a guide lamp in accordance with the vehicle progress degree, or by changing a flickering cycle of the guide lamp to differentiate the vehicle progress.

9. The apparatus of claim 1, wherein the information providing unit includes a guide lamp that is lighted to inform the driver that the vehicle enters the coasting guide section.

10. The apparatus of claim 1, wherein the information providing unit outputs information for guiding the driver in coasting the vehicle, inducing the driver to take his/her foot off an accelerator pedal.

11. A method for guiding a driver to coasting of an eco-friendly vehicle, the method comprising:
acquiring, by a controller, i) a current speed of the vehicle detected through a vehicle speed detector, ii) a location of a deceleration event in front of the vehicle at which the vehicle needs to be decelerated, iii) a target vehicle speed at the deceleration event from map data stored in a data storage unit, iv) Global Positioning System (GPS) information received from a GPS receiver, v) a current decelerating force of the vehicle, and vi) a range of decelerating force based on motor torque of the vehicle;
determining, by the controller, whether the vehicle enters a coasting guide section, which is a section of a road on which the deceleration event is located, based on the current speed of the vehicle, the target vehicle speed at the deceleration event, the current decelerating force of the vehicle, and the range of decelerating force; and
controlling, by the controller, an information providing unit such that the information providing unit outputs information for guiding the driver in coasting of the vehicle when the controller determines that the vehicle enters the coasting guide section.

12. The method of claim 11, wherein the map data is three-dimensional (3D) map data including road slope information indicating a road slope, the method further comprising:
acquiring, by the controller, road slope information associated with the deceleration event from the 3D map data; and
determining, by the controller, whether the vehicle enters the coasting guide section based on the current vehicle speed, the target vehicle speed, and the road slope.

13. The method of claim 12, wherein the coasting guide section, is a section of a road on which the deceleration event is located where the driver needs to take his/her foot off an accelerator pedal in order to decelerate the vehicle to a speed within a final speed allowable error, which is set based on the target vehicle speed when the vehicle reaches the location of the deceleration event by driving according to of the current vehicle speed and the road slope and thereafter decelerating by coasting.

14. The method of claim 13, further comprising:
acquiring, by the controller, in real-time a residual distance between the deceleration event and a current location of the vehicle based on the 3D map data and the GPS information;
calculating, by the controller, a start distance between a start location of the coasting guide section and the deceleration event and an end distance between an end location of the coasting guide section and the deceleration event based on the current vehicle speed, the target speed, and the road slope; and
determining, by the controller, whether the vehicle enters the coasting guide section according to the calculated start distance, the calculated end distance, and the acquired residual distance.

15. The method of claim 14, wherein the start location is calculated based on an accelerator pedal-off location at which a speed of the vehicle is reduced with a minimal deceleration torque of a drive motor during the coasting according to the current vehicle speed and the road slope and then reaches a lower limit speed of the final speed allowable error, and
the end location is calculated based on an accelerator pedal-off location at which the speed of the vehicle is reduced with a maximum deceleration torque of the drive motor during the coasting according to the current vehicle speed and the road slope and then reaches an upper limit speed of the final speed allowable error.

16. The method of claim 14, further comprising:
determining, by the controller, that the vehicle enters the coasting guide section when the residual distance is greater than or equal to the end distance and is less than or equal to the start distance.

17. The method of claim 14, further comprising:
obtaining, by the controller, a relative vehicle location indicating a vehicle progress degree within the coasting guide section based on the start distance, the end distance, and the residual distance, wherein the information providing unit informs the driver of the relative vehicle location.

18. The method of claim 17, wherein the information providing unit indicates the vehicle progress degree within the coasting guide section by displaying a progress bar or numbers, by changing a color or brightness of a guide lamp in accordance with the vehicle progress degree, or by changing a flickering cycle of the guide lamp to differentiate the vehicle progress.

19. The method of claim 11, wherein the information providing unit includes a guide lamp that is lighted to inform the driver that the vehicle enters the coasting guide section.

20. The method of claim 11, wherein the information providing unit outputs information for guiding the driver in coasting the vehicle, inducing the driver to take his/her foot off an accelerator pedal.

\* \* \* \* \*